Aug. 7, 1934.   J. C. KARNES ET AL   1,968,836
SYSTEM OF AND APPARATUS FOR VISUALLY INTERPRETING
THE OPERATION OF A CONTROL MECHANISM
Filed June 12, 1930
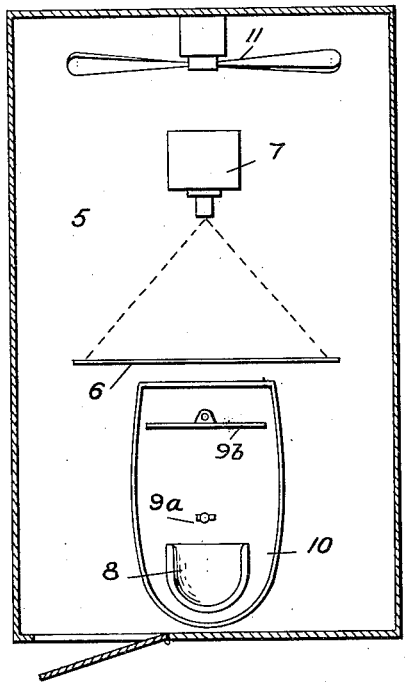
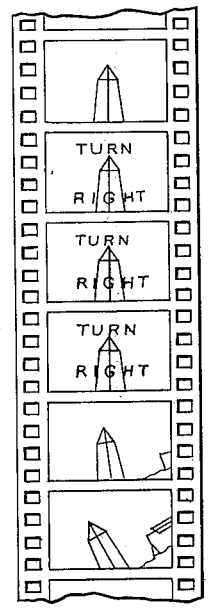
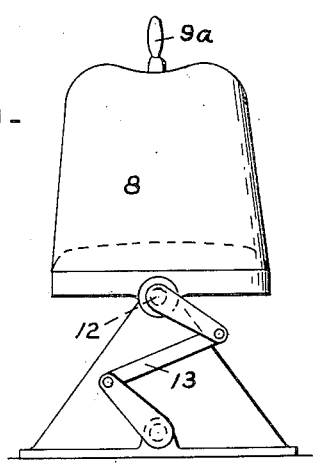
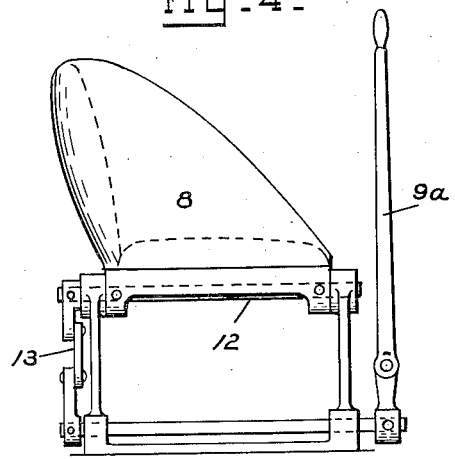
INVENTORS
J. C. Karnes
BY G. J. Kessenich
W. N. Roach
ATTORNEY Patented Aug. 7, 1934

1,968,836

UNITED STATES PATENT OFFICE 1,968,836

SYSTEM OF AND APPARATUS FOR VISUALLY INTERPRETING THE OPERATION OF A CONTROL MECHANISM

James C. Karnes, Buffalo, N. Y., and Gregory J. Kessenich, Madison, Wis.

Application June 12, 1930, Serial No. 460,737

1 Claim. (Cl. 88—19.5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a system of and apparatus for visually interpreting the operation of a control mechanism.

The invention has reference more particularly to the training of operators of vehicles, such as aircraft, and proposes to afford instruction in the manipulation of the controls by reproducing motion pictures depicting changes of environment corresponding to and in harmony with evolutions of the vehicle. The reproduction is given under conditions which will convey an impression of reality.

A practical embodiment of the invention is illustrated in the accompanying drawing, wherein:

Fig. 1 is a plan view of the apparatus employed in the present system;

Fig. 2 is a detail view of a portion of a film;

Fig. 3 is a view in rear elevation of the seat for the student; and

Fig. 4 is a view in side elevation of the control and the seat.

In a simple form which the invention may assume a chamber 5 is equipped with a screen 6 on which motion pictures are to be projected by the projecting machine 7. A seat 8 is placed in front of the screen and a system of controls, a hand control 9a and a foot control 9b, similar to those actually employed in a vehicle are placed between the seat and the screen. In the following description a system of operating an airplane will be used as an example and, accordingly, the seat will be surrounded by a frame 10 to suggest a cockpit or cabin.

A motor driven fan 11 placed forwardly of the seat is provided to produce, when desired, a sound and an air stream simulating those obtaining in actual flight.

The motion pictures that are to be shown on the screen are to be taken from an airplane, the camera occupying approximately the position of the pilot's head and focused to produce views exactly representing those that would appear to the pilot. In taking the pictures the plane is piloted from some other position as for example from the alternate cockpit of a dual-control machine. The pictures can be made of all or any portion of a flight.

Instructions relating to the manner of operating the controls 9a and 9b to correspond to a particular evolution of the airplane may be imparted visually or audibly. In Fig. 2 there is illustrated a method of incorporating the instructions on the film.

When the instructions appear on the screen the student operates the controls in compliance therewith and the ensuing pictures illustrate the evolution of the airplane by changes in the environment as they actually would appear to the pilot of an airplane. Such changes will include portions of the plane, the horizon, the earth and the sky. In this way an impression of reality is conveyed that will afford the observer a sense or a feeling of actually flying.

The seat 8 is mounted on a longitudinal axis 12 so that it is free to tilt laterally by a system of levers 13 associated with the control 9a. For example, when the picture shows the airplane banking as in turning to the right the corresponding operation of the control will appropriately incline the seat.

When a vehicle in motion undergoes a change of direction the force of inertia tends to move the occupants in the original direction and a sensing of this characteristic will be conveyed to the student through the picture rather than through the movement of the seat. To this end the camera which takes the picture is flexibly mounted as on a ball and socket joint and maintains a normal upright position. Due to the inertia of the camera any change in the direction of the airplane will produce a movement of the camera corresponding to the movement of an occupant of the airplane. The field of view of the camera will thereby be changed and record a variation in the normal environment. In the foregoing manner a record may be produced of all evolutions of which a vehicle is capable, whether alone or in groups.

We claim:

A motion picture film comprising a series of pictures made from the point of vision of a pilot of a vehicle and depicting changes in environment resulting from evolution of the vehicle and from displacement of a flexibly mounted camera due to inertia.

JAMES C. KARNES.
GREGORY J. KESSENICH.